United States Patent

[11] 3,609,533

| [72] | Inventor | Robert J. Pardis<br>1247 Carmel Drive, Simi, Calif. 93065 |
|---|---|---|
| [21] | Appl. No. | 782,935 |
| [22] | Filed | Dec. 11, 1968 |
| [45] | Patented | Sept. 28, 1971 |

[54] FAULT LOCATING SYSTEM FOR DETERMINING DISTANCE OF FAULT ON A TRANSMISSION LINE FROM A PREDETERMINED POSITION THEREON
13 Claims, 3 Drawing Figs.

| [52] | U.S. Cl. | 324/52, 179/175.3 |
|---|---|---|
| [51] | Int. Cl. | G01r 31/08 |
| [50] | Field of Search | 324/52, 66; 179/175.3 |

[56] References Cited
UNITED STATES PATENTS

| 2,493,800 | 1/1950 | Biskeborn | 324/52 |
| 2,717,992 | 9/1955 | Weintraub | 324/52 X |
| 2,725,526 | 11/1955 | Stringfield et al. | 324/52 |
| 2,794,071 | 5/1957 | Hughes et al. | 324/52 X |
| 3,462,681 | 8/1969 | Biskup | 324/52 |

Primary Examiner—Gerard R. Strecker
Attorney—Spensley and Horn

ABSTRACT: A system for accurately and automatically determining the location of a fault occurring on a high-voltage electric power transmission line. A time interval measuring unit is located at one station on the line; the fault pulse is transmitted to the measuring unit as a first pulse through another station and a first delay. The fault pulse is transmitted to the measuring unit as a second pulse through the one station and a second delay, with the measured interval between arrival of the first and second pulses providing a measure of the distance of the fault from the one station.

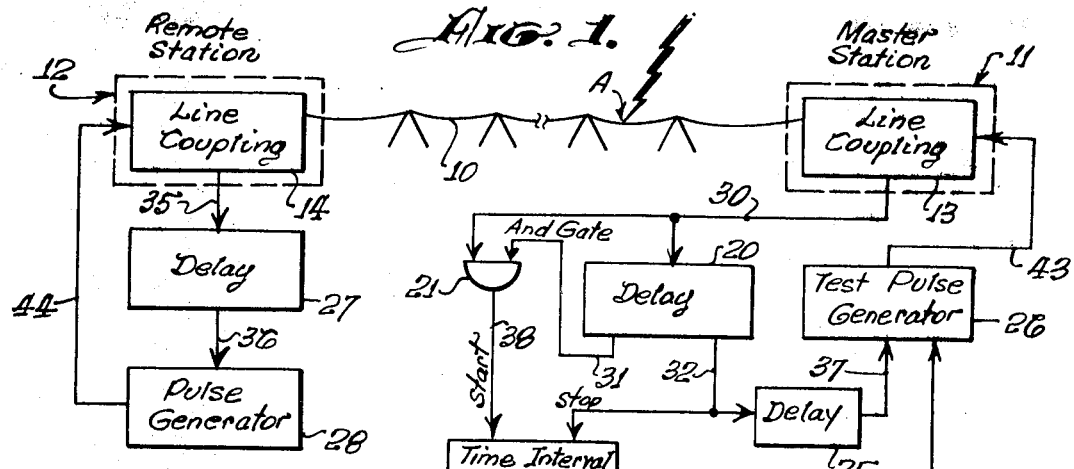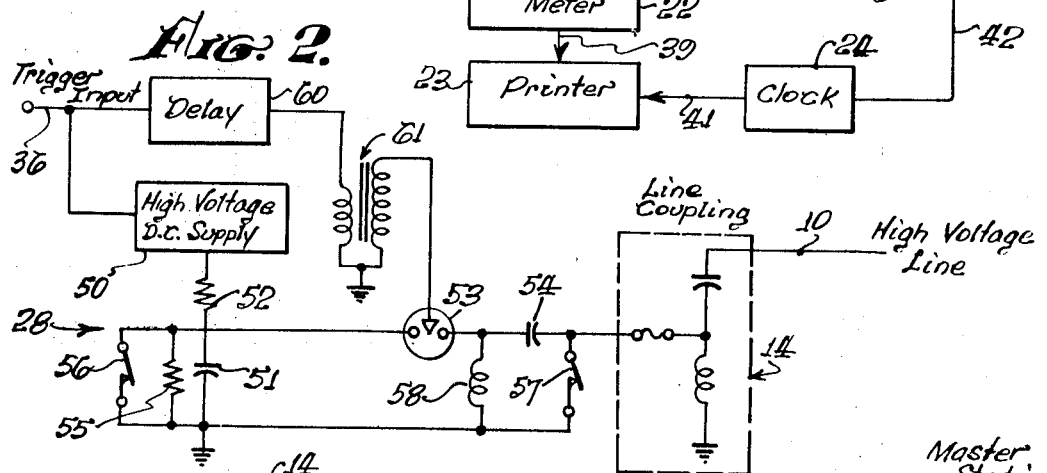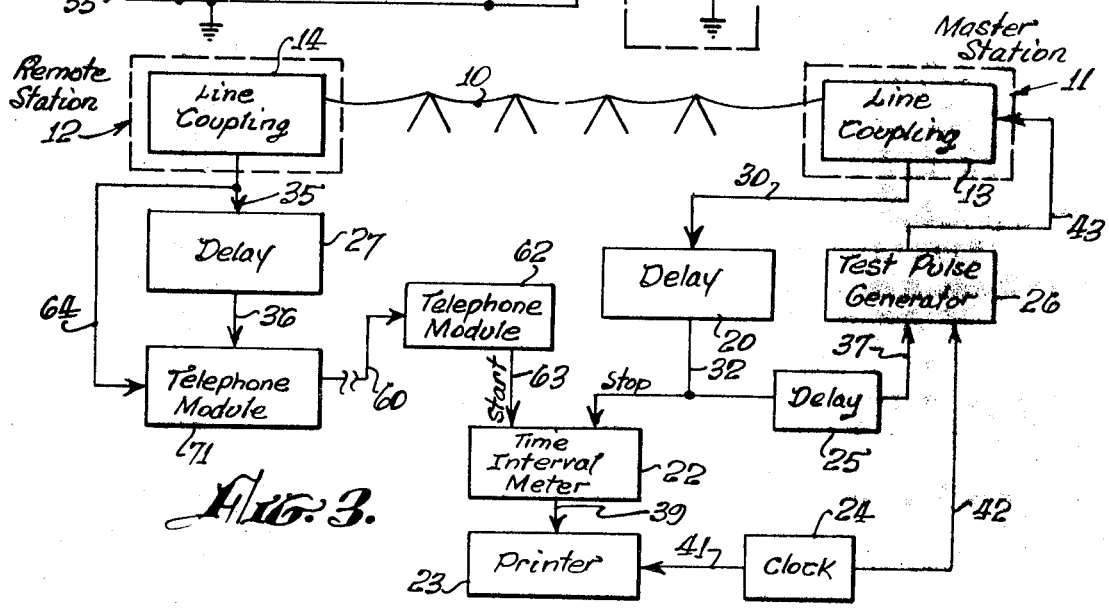

FAULT LOCATING SYSTEM FOR DETERMINING DISTANCE OF FAULT ON A TRANSMISSION LINE FROM A PREDETERMINED POSITION THEREON

BACKGROUND OF THE INVENTION

This invention relates to apparatus for determining the location of a fault occurring on a high-voltage electric power transmission line. Faults are usually of a dynamic or transient nature, with service being restored very quickly. A typical example of a fault is disturbance produced by a lightning strike on the line. If a conductor is not severed, service may not be interrupted. However, the line should be inspected at the fault location to determine if any physical damage has been sustained. A transmission line may be of the order of 500 miles long and it is highly desirable to be able to accurately determine the exact location of the fault, preferably with an accuracy of a few hundred feet so that the amount of hardware which must be visually inspected (i.e., transmission line and associated equipment) to pinpoint the fault is held at a minimum.

A wide variety of systems have been utilized for this purpose since transmission lines were introduced. It is an object of the present invention to provide an automatic new and improved fault location system which provides an automatic measurement of fault location from a given station shortly after occurrence of a fault which system can also, if desired, provide a visual or printed readout of fault location directly in distance units. The particular object of the invention is to provide such a system which is highly accurate and which can pinpoint a fault location within about ±500 feet.

SUMMARY OF THE INVENTION

The system of the invention utilizes a time interval measuring unit, typically a digital counting device of high accuracy and resolution, with the fault pulse itself providing the first (either a start or stop) and a second (either a stop or start) signals for the counting operation. When a fault occurs on a transmission line, a fault pulse is propagated along the line in both directions. These two pulses are appropriately manipulated and utilized to provide the desired measurement information.

It is an object of the invention to provide such a system which utilizes the transmission line itself for pulse signal transmission between stations on the line.

Another object is to provide an alternative arrangement whereby other transmission systems such as telephone lines, can be utilized for pulse signal transmission.

Another object of this invention is to provide such a system which operates automatically and which provides for automatic calibration and testing.

It is a further object of the invention to provide a new and improved pulse generator for producing signal pulses and test pulses for the high-voltage transmission lines.

DESCRIPTION OF THE DRAWINGS

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawings:

FIG. 1 is a block diagram illustrating a preferred embodiment of the fault location system of the present invention in conjunction with a transmission line;

FIG. 2 is an electrical schematic of a preferred form of pulse generator which may be employed to test the system of FIG. 1; and FIG. 3 is a diagram similar to that of FIG. 1 illustrating an alternative embodiment of the invention.

DESCRIPTION OF THE PRESENTLY PREFERRED EMBODIMENTS

Referring to FIG. 1, a high-voltage electric power transmission line 10 extends between a master station indicated generally at 11 and a remote station indicated generally at 12. A coupling unit 13 at the master station provides for coupling pulses to and from the line. A similar coupling unit 14 at the remote station provides for coupling pulses to and from the line. Conventional coupling units may be utilized for this purpose.

The equipment at the master station includes a delay counter 20, an and gate 21, a time interval meter 22, and a printer 23. The system may also include a clock 24, a delay unit 25, and a test pulse generator 26. A delay counter 27 and a pulse generator 28 are provided at the remote station. While the system is illustrated with one transmission line, a master station and a remote station, the system is equally applicable to use with a plurality of transmission lines using a common master station, with a separate remote station for each transmission line.

In operation upon the occurrence of a fault such as at A, the delay unit 20 receives an input pulse from the line coupling unit 13 via line 30 and provides an output pulse to the gate 21 on line 31 after a first predetermined time delay. Additionally, the delay unit 20 provides an output pulse to the time interval meter 22 and to the delay unit 25 via line 32 after a second predetermined time interval which exceeds the first predetermined time delay. By way of example, the delay counter 20 may be a conventional high resolution, high accuracy digital counter or time delay generator, to present two delayed output signals, one later than the other. It preferably incorporates switches for presetting the desired time intervals. The delay counter 27 is similar to the delay counter 20, receiving an input on line 35 from the line coupling unit 14 and providing an output to the pulse generator 28 on line 36. The delay unit 25 may also be similar to the delay counter 20, receiving an input on line 32 and providing an output to the test pulse generator 26 on line 37.

The gate 21 may be a conventional type of and gate and functions to pass pulses on line 30 to the time interval meter 22 via line 38 after receipt of a pulse from the counter 20 on line 31. The time interval meter 22 is a conventional unit which measures the time elapsed between receipt of a first or start pulse on line 38 and a second or stop pulse on line 32. A typical time interval meter will provide a visual indication of the measured interval and also provide an output on line 39 for recording a printer 23. By appropriately selecting the parameters for the system, the output of the time interval meter can be made to read directly in distance units.

A clock 24 periodically provides an output to the printer 23 on line 41 for recording the time of day. The clock also periodically provides an output to the test pulse generator 26 on line 42 to initiate a test to determine if the system is in proper working order.

On receipt of an input pulse on line 37 or line 42, the pulse generator 26 provides a high-voltage pulse to the coupling unit 13 via line 43. The pulse generator 28 provides a similar high-voltage pulse to the coupling unit 14 via line 44 on receipt of an input pulse on line 36. A preferred design for the pulse generators is shown in FIG. 2 and will be described in detail hereinafter.

In the operation of the system, lightening may strike the line as illustrated at point A. The lightning strike produces a first electrical pulse which travels along the transmission line to the master station and a second electrical pulse which travels along the transmission line to the remote station. A pulse will travel along the line at a known constant velocity and the time required for a pulse to travel to a station can be utilized to provide a direct measure of the distance of the fault location from the station. The fault pulse arrives at the master station 11 and is coupled to the line 30 by the coupling unit 13. The fault pulse is blocked at the gate 21, but does serve as the start pulse at the counter 20. There is a small delay in fault transmission from the line through the master station to the gate and counter. This delay and similar delays in pulse transmission through the system can be determined and taken into account in the operation of the system, as will be shown in an example.

The fault pulse arriving at the remote station is transmitted to the counter 27 as an input to start the counter. The counter proceeds to count to the preset value, producing an output at the end of this period of time. The counter output triggers the pulse generator 28 and produces a pulse at the remote station for transmission along the line to the master station and then to the gate 21 and counter 20. Since the counter 20 is already in operation, this pulse has no effect thereon. By this time, the counter 20 has provided an output on line 31, opening the gate 21 and permitting the pulse from the pulse generator 28 to pass to the time interval meter as the start pulse. The counter 20 has been operating throughout this time period and when the second longer predetermined count stage is reached, the output pulse from the counter 20 is transmitted to the meter 22 as a stop pulse. The time interval measured by the meter 22 is a function of the distance of point A from the master station.

The delay introduced by the counter 27 and the second or longer delay introduced by the counter 20 are selected such that the total delay between the master station and the meter through the counter 20 is at least as great as the total delay between the master station and the meter through the transmission line, the remote station and the counter 27. The delay introduced by the first or shorter period of the counter 20 is selected such that the total delay between the remote station and the gate 21 through the counter 20 and bypassing the counter 27 is less than the delay between the remote station and the gate 21 through the counter 27 and bypassing the counter 20.

By way of example, consider a transmission line which is 10 units of time in length, that is to say, 10 units of time are required for a pulse to travel from one station to the other. Further, let the delay from the master station to the gate through the counter 20 be 135 units of time and the delay from the master station to the time interval meter through the counter 20 be 171 units of time. Let the delay from the remote station to the pulse generator 28 through the counter 27 be 150 units of time and the delay at the pulse generator be 1 unit of time. If the point A is 3 units of time from the master station, the fault pulse will travel along the line to the master station to the gate and to the counter 20. The fault pulse will be blocked at the gate, however the counter 20 will function to open the gate at 138 time units after occurrence of the fault. The fault pulse will also travel along the line to the remote station to the counter 27. The pulse generator 28 will be triggered in due course and the start pulse will travel from the remote station to the master station and through the gate to the meter 22, arriving 168 time units after occurrence of the fault. The counter 20 will terminate its second or longer count and produce the stop pulse for the meter at 174 time units after occurrence of the fault. The interval measured by the meter 22 is 6 time units, which can be divided by two to provide a direct indication of the distance of point A from the master station.

The system may also include means for automatic calibration after occurrence of a fault and for periodic testing to ascertain that the system is in proper operating condition. When energized, the pulse generator 26 introduces a pulse at the master station which simulates the occurrence of fault at the master station or zero distance point. The stop pulse on line 32 provides an input to delay unit 25, which generates an actuating pulse for the pulse generator 26 shortly after occurrence of a fault, typically in the order of about 15 seconds. The clock 24 provides a similar actuating pulse at periodic intervals, typically every few hours. The distance indicated by a test run should be zero and any small deviation can be added or subtracted to the immediately preceding fault location measurement as a calibration. Of course, if a large deviation occurs during a periodic test, the system should be checked for malfunctions.

A new and improved pulse generator suitable for use as the generator 28 and the generator 26 of FIG. 1 is shown in FIG. 2. A high-voltage DC supply 50 provides for charging a storage capacitor 51 through a resistor 52, with the supply providing an output typically in the order of 9,000–18,000 volts, depending upon the particular application. The storage capacitor 51 is coupled through a spark gap switch 53 and a coupling capacitor 54 to a line-coupling unit, such as the unit 14. A bleeder resistor 55 is connected in parallel with the storage capacitor 51 for discharging the capacitor within a few minutes after power is removed, in the event the switch 53 is not actuated. A normally opened safety switch 56 may be provided for discharging the capacitor 51, as when a cover on the enclosure for the generator is opened. A similar normally opened switch 57 provides for grounding the capacitor 54. An inductor 58, although not necessary, may be provided for the following reasons. There may for example be a voltage of 250,000 volts present between line 10 and ground. The capacitor 54 and the voltage divider 58 act as a voltage divider. If the inductor (included in the line coupling) should be open circuited these 250,000 volts appear as a spark gap and the coil draws this voltage to ground. It is desirable that coil 58 be of low resistance, but high inductance. The switch 53 is actuated by an input pulse on line 36 via a delay unit 60 and a voltage step-up transformer 61.

When an input trigger pulse is received on the line 36, the DC supply is turned on and acts to charge the capacitor 51 to a high voltage. The delay unit 60 provides sufficient delay for charging of the capacitor 51, typically about 15 seconds. The delay unit provides an output pulse to the primary of the transformer 61 a predetermined time after arrival of the trigger pulse on the line 36. The transformer 61 provides voltage amplification, which the secondary connected to the trigger electrode of the switch 53 for triggering the switch into conduction. When the switch 53 is closed or conducts, the capacitor 51 is discharged onto the transmission line, providing a very sharp pulse with a very short rise time. A preferred circuit for the pulse generator utilizes a control spark gap such as a GP–39 manufactured by E. G. & G., Inc., for the switch 53 and an ignition transformer such as a TR69 also manufactured for the same company as the transformer 61.

When used with a transmission line 111 miles in length, the storage capacitor is selected as 0.1 microfarads and is charged to 14,000 volts from the supply 50. With this arrangement, the high-voltage pulse provided to the line coupling has a rise time of less than 7 nanoseconds. Thus, it is seen that the pulse generator provides a high-voltage pulse with very sharp leading edge, thereby simulating a fault pulse for transmission along the high-voltage line.

An alternative embodiment of the system of FIG. 1 is illustrated in FIG. 3, wherein components corresponding to those of FIG. 1 are identified by the same reference numerals.

The system of FIG. 3 utilizes a separate transmission line, such as a telephone-type line 60 for transmitting the start pulse from the remote station to the time interval meter. This arrangement eliminates the requirement for the high-voltage pulse generator 28, but introduces the cost of the additional transmission line. In one embodiment, a conventional dataphone line may be utilized with the output 36 from the counter 27 connected to the telephone input module 71 which will transmit digital data from one telephone to another and with the telephone output module 62 connected to the meter 22 via a line 63. With this arrangement, the line 60 is continuously in service and the rental charges are relatively high. In an alternative arrangement, a conventional long-distance line may be utilized, with the unit 71 providing for automatically dialing up a line between the unit 71 and unit 62 on receipt of a fault pulse from the coupling unit via line 64, with the counter 27 providing sufficient delay for making the long-distance line connection.

As with the system of FIG. 1, the test pulse generator 26 provides for periodic testing of the overall system and for calibration of the system including the line 60 following occurrence of a fault.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. In a system for determining the location of a fault on a transmission line between a master station and a remote station, which fault produces a fault pulse that travels from the fault location to both stations, with the system having means for coupling pulses to and from the line at each station, the improvement comprising: in combination:
  a. first delay means for introducing a first delay of a predetermined period between the input and output thereof; having its input connected to said remote station and circuit means connecting the output thereof to said remote station,
  b. time interval means for measuring the time period between receipt of it of a first pulse and a second pulse,
  c. circuit means connected to receive pulses from said master station and having its output connected to said time interval means, said circuit means comprising second time delay means started by a fault pulse from said master station, said pulse resulting from a fault occurring in said transmission line, and travelling directly to the master station, and means for preventing said fault pulse from reaching said time interval means and permitting a generated pulse from said master station to reach said time interval means as the first pulse thereto, said generated pulse resulting from said fault pulse travelling directly from said fault and reaching said first delay means at said remote station as an input thereto, said generated pulse being generated at said remote station in response to an output from said first delay means and being transmitted through said transmission line to said master station, said second time delay means generating a pulse to said time interval means as the second pulse thereto a predetermined time after reception of said first pulse by said second time delay means,
  c-1. with the delay periods of said first and second delay means being selected such that the delay between the master station and said time interval means through said second delay means is at least as great as the delay between the master station and said time interval means through the line, the remote station and said first delay means, and
  c-2. with the time between arrival of the first and second pulses at said time interval means following occurrence of a fault being a function of the distance of the fault location from one of the stations.

2. A system as defined in claim 1, wherein said circuit means connecting the output of said first delay means to said remote station includes a pulse generator having the input thereof connected to the output of said first delay means and the output thereof connected to said remote station.

3. A system as defined in claim 1, wherein said means for preventing said first pulse from reaching said time interval means and for permitting a second pulse to reach said time interval means comprises control gate means having an input connected to said master station, an output connected to said time interval means, and an input connected to the output of said second time delay means, said second time delay means comprising means for generating a first pulse to said control gate means and thereafter said second pulse to said time interval means after reception of said fault pulse from said master station.

4. A system as defined in claim 3, wherein said second time delay means having the delay period for the generation of said pulse to said control gate means being selected such that the delay between the line remote station and said control gate means through said second delay means, bypassing said first delay means, is less than the delay between the line remote station and said control gate means through said first delay means, bypassing said second delay means.

5. A system as defined in claim 2, including:
  a. a test pulse generator for generating a test pulse simulating a fault pulse;
  b. circuit means for coupling a test pulse from said test pulse generator to the line master station; and
  c. means for actuating said test pulse generator to provide a test pulse after a second pulse is received at said time interval means.

6. A system as defined in claim 1, including:
  a. a test pulse generator for generating a test pulse simulating a fault pulse;
  b. circuit means for coupling a test pulse from said test pulse generator to the line master station; and
  c. means for actuating said test pulse generator to provide a test pulse after a second pulse is received at said time interval means.

7. A system as defined in claim 6 in which said means for actuating includes a third delay means having said second pulse as an input and providing an output to said test pulse generator a predetermined period after receiving said second pulse.

8. In a system for determining the location of a fault on a transmission line between a master station and a remote station, which fault produces a fault pulse that travels from the fault location to both stations, with the system having means for coupling pulses to and from the line at each station, the improvement comprising; in combination:
  a. time interval means for measuring the time period between receipt by it of a start pulse and a stop pulse,
  b. means for generating a start pulse in response to a fault pulse occurring in said transmission line and arriving at said remote station comprising first delay means having the input thereof connected to said remote station and generating an output pulse a predetermined time after reception of the input pulse from said remote station,
  c. telephone-type transmission line means having the input thereof coupled to the output of said first delay means and the output thereof coupled to said time interval means for transmission of the output pulse from said delay means to the time interval means as the start pulse therefor,
  d. means for generating a stop pulse in response to the fault pulse occurring in said transmission line and arriving at said master station comprising second delay means having the input thereof connected to said master station and generating an output pulse a predetermined time after reception of the input pulse from said master station, and
  e. means for coupling the output of said second delay means to said time interval means for coupling the output pulse from said second delay means to the time interval means as the stop pulse therefor,
  f. with the delay periods of said first and second delay means being selected such that the delay between the master station and said time interval means through said second delay means is at least as great as the delay between the master station and said time interval means through the line, the remote station and said first delay means, and
  g. with the time between arrival of the start and stop pulses at said time interval means following occurrence of a fault being a function of the distance of the fault location from one of the stations.

9. A system as defined in claim 8 in which said telephone-type transmission line is continuously connected between said first delay means and said time interval means.

10. A system as defined in claim 8 in which said telephone-type transmission line is intermittently connected between said first delay means and said interval means, and in which said system includes means for automatically dialing up a telephone-type transmission line after receiving a pulse at the line remote station.

11. A system as defined in claim 10 including:
  a. a test pulse generator for generating a test pulse simulating a fault pulse;

b. circuit means for coupling a test pulse from said test pulse generator to the line master station; and c. means for actuating said test pulse generator to provide a test pulse after said second pulse is received at said time interval means.

12. A system as defined in claim 9 including:

a. a test pulse generator for generating a test pulse simulating a fault pulse;

b. circuit means for coupling a test pulse from said test pulse generator to the line master station; and c. means for actuating said test pulse generator to provide a test pulse after a second pulse is received at said time interval means.

13. In a system for determining the location of a fault on a transmission line between a master station and a remote station, which fault produces a fault pulse that travels from the fault location to both stations, with the system having means for coupling pulses to and from the line at each station, the improvement comprising in combination:

a. first delay means for introducing a first delay of a predetermined period between the input and output thereof;

b. second delay means for introducing second and third delays of predetermined periods between the inputs and outputs thereof, said third delay being greater than said second delay;

c. time interval means for measuring the time period between receipt of a first pulse and a second pulse;

d. circuit means for coupling a pulse from the line remote station to said first delay means as an input;

e. circuit means for coupling a pulse from said first delay means to said time interval means as a first pulse including a pulse generator connected between said first delay means and the line remote station, the line itself, and a gate connected between the line master station and the time interval means, with said pulse generator providing a pulse for transmission along the line as the first pulse in response to an output pulse from said first delay unit, and with said control gate including means for blocking a fault pulse and passing said first pulse from the line master station to said time interval means;

f. circuit means for coupling a pulse from the line master station to said second delay means as an input;

g. circuit means for coupling a pulse from said second delay unit to said time interval unit as said second pulse, with the delay periods of said first and second delay means being selected such that the delay between the master station and said time interval means through said second delay means is at least as great as the delay between the master station and said time interval means through the line, the remote station and said first delay means, and with the time between arrival of the first and second pulses at said time interval unit following occurrence of a fault being a function of the distance of the fault location from one of the stations, and with said second delay means providing prior to the second pulse a control pulse for said gate permitting passage of a first pulse on receipt of the control pulse, with the delay period of said second delay unit for the control pulse being selected such that the delay between the line remote station and said gate through said second delay means, bypassing said first delay unit, is less than the delay between the line remote station and said control gate through said first delay means, bypassing said second delay means;

h. a test pulse generator for generating a test pulse simulating a fault pulse;

i. circuit means for coupling a test pulse from said test pulse generator to the line master station; and j. means for actuating said test pulse generator to provide a test pulse after said second pulse is received at said time interval means.